Sept. 8, 1959  E. L. MAYO  2,902,827
POWER BRAKE SYSTEM FOR AUTOMOBILES
Filed Dec. 3, 1957  3 Sheets-Sheet 1
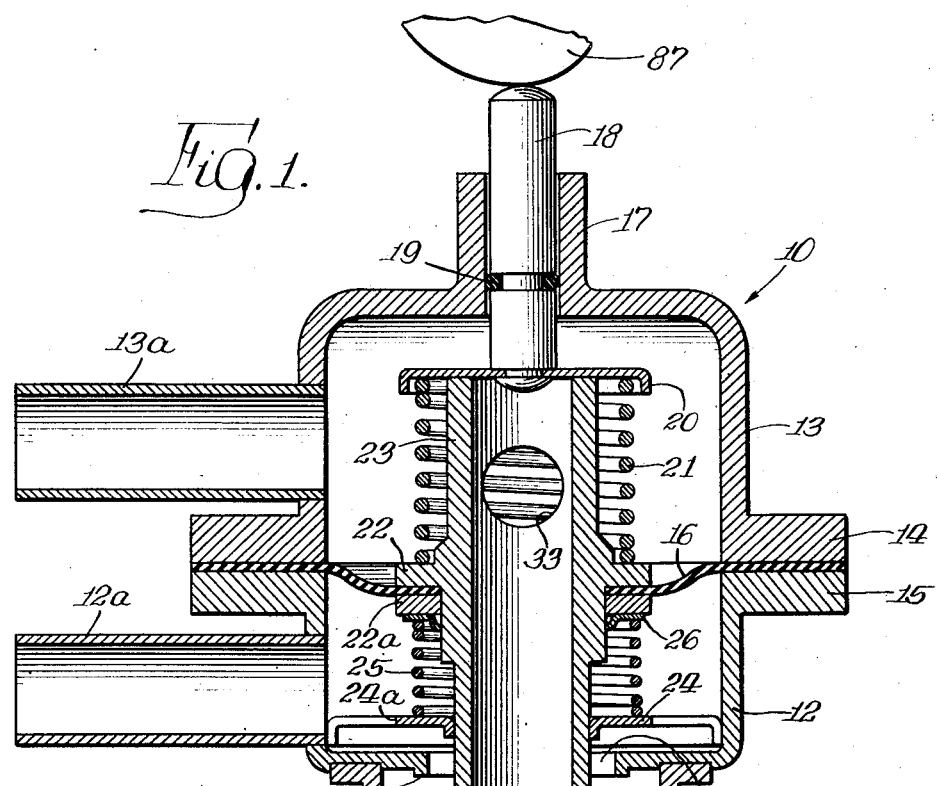
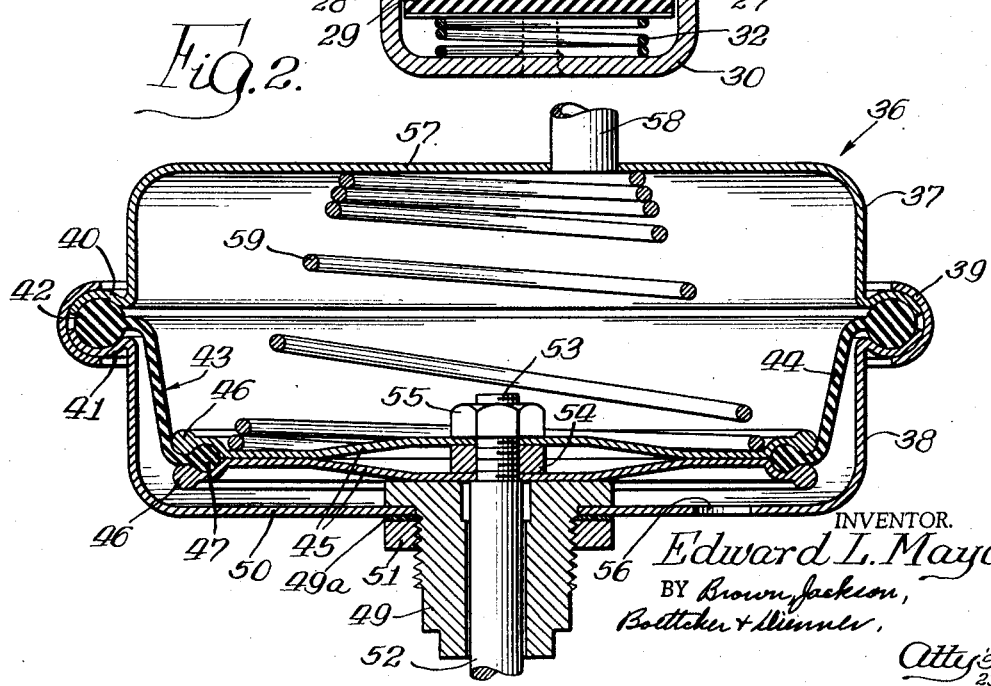
INVENTOR.
Edward L. Mayo,
BY Brown, Jackson,
Boettcher & Dienner,
Attys.

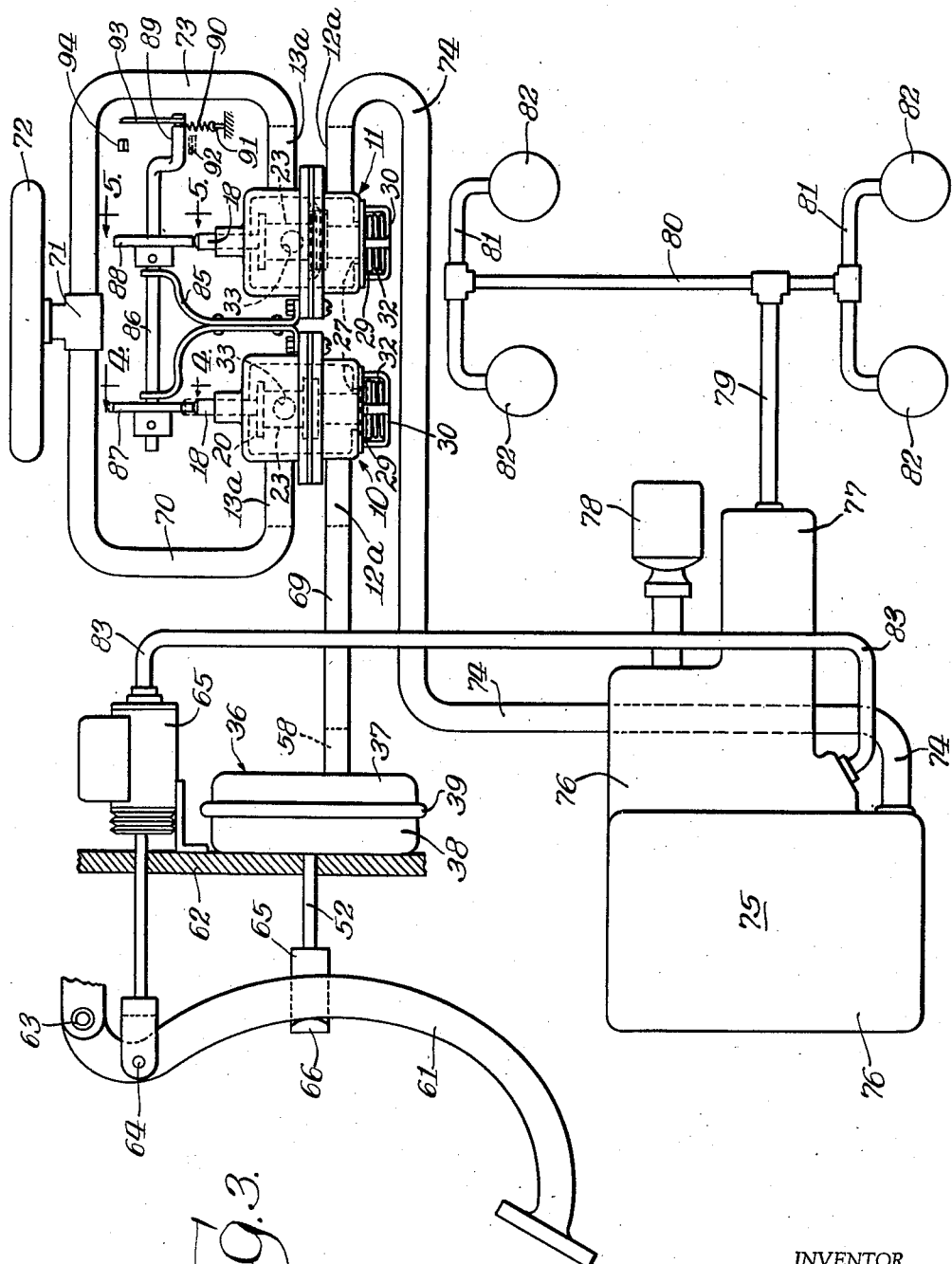

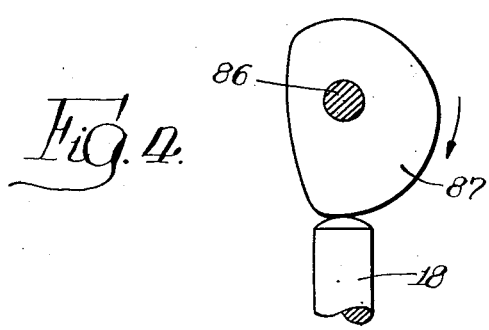
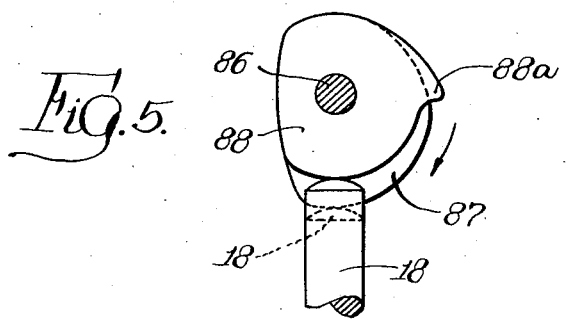
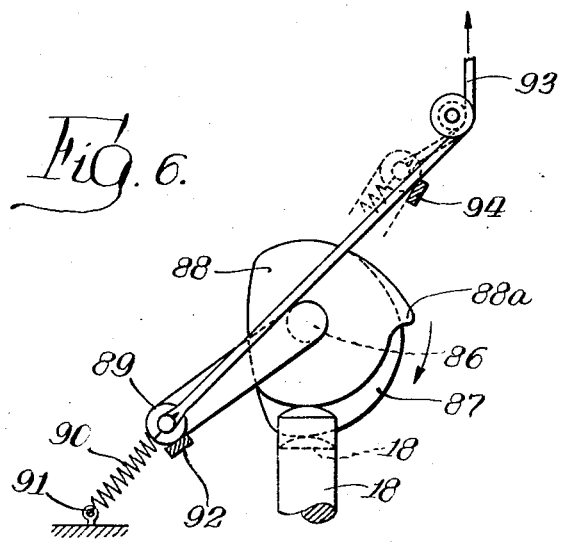

United States Patent Office 2,902,827
Patented Sept. 8, 1959

2,902,827

POWER BRAKE SYSTEM FOR AUTOMOBILES

Edward L. Mayo, Cleveland, Ohio, assignor to The Bishop and Babcock Manufacturing Company, Cleveland, Ohio, a corporation of Ohio Application December 3, 1957, Serial No. 700,332

12 Claims. (Cl. 60—54.5)

This invention relates to power braking systems for automotive vehicles, and has to do with a braking system particularly suitable for use with passenger automobiles though applicable, in its broader aspects, to automotive vehicles generally.

Power brakes for passenger automobiles are well known and rather extensively used. In all of such power brakes with which I am familiar braking is accomplished by pressure exerted by the foot upon the conventional brake pedal and, in general, such systems are over-sensitive at lower and moderate speeds up to approximately 30 miles per hour, due to the fact that much greater braking power is available than is required at such speeds, with the result that but slight pressure on the brake pedal results in an abrupt stop of the automobile. That is objectionable, especially in heavy traffic, because it frequently happens that a following automobile, particularly if not equipped with power brakes, is unable to stop in sufficient time to prevent a collision. The known power brake systems referred to employ a booster unit having a suction operated motor which is connected to the engine intake manifold responsive to pressure exerted on the brake pedal. Such a system, as above noted, is over-sensitive at the lower speeds.

My invention is directed to a brake system which avoids the objections above noted to the presently known brake systems. To that end I provide means whereby the booster of the brake system may be disabled when travelling at moderate speeds and in traffic and may be enabled when travelling at the higher speeds. More specifically, I provide, in conjunction with the booster of the brake system, a vacuum operated power motor having operating connection to the brake pedal for exerting pressure thereon and valve control means whereby the booster may be disabled and the pedal power motor enabled when driving at lower speeds, the connections between the pedal power motor and the pedal being such that the pedal may be pressed in braking direction independently of its associated motor and the valve control means being such that when travelling at higher speeds both the pedal power motor and the booster may be enabled and opened to variable extent to the source of suction and, in case of emergency, both fully opened to the suction source rendering available adequate power for braking to stop the automobile abruptly in case of emergency. The valve control means is operated in such a manner as to avoid necessity of the driver removing his foot from the accelerator pedal thereby avoiding delay in initiating the braking operation while also rendering available engine power in the event of a skid incident to braking. In the braking system of my invention foot pressure on the brake pedal may be utilized for braking purposes when travelling at low speed in traffic, the power of the pedal operating motor may be utilized when travelling at higher speeds, up to approximately 30 miles per hour, and when travelling at speeds above approximately 30 miles per hour the power of both the pedal operating motor and the booster may be utilized for braking and may be progressively increased until both of the motors are wide open to suction giving the maximum braking power adequate for braking to a crash stop in case of emergency. Further objects and advantages of my invention will appear from the detail description.

In the drawings:

Figure 1 is an axial sectional view of one of the control valves of the braking system of my invention, certain parts being shown in elevation;

Figure 2 is an axial sectional view of the pedal actuating suction operated power motor of the braking system of my invention, certain parts being shown in elevation;

Figure 3 is a diagrammatic view of the braking system of my invention shown as conditioned for operation;

Figure 4 is a sectional view, on an enlarged scale, taken substantially on line 4—4 of Figure 3 but with the cam shaft in its normal position;

Figure 5 is a sectional view, on an enlarged scale, taken substantially on line 5—5 of Figure 3 but with the cam shaft in its normal position; and Figure 6 is an end view of the control valve operating cam shaft and associated parts of Figure 3, on an enlarged scale but with the cam shaft in its normal position.

The brake system of my invention, to be referred to more fully later, comprises two control valves 10 and 11 of the same construction and operation, and a detail description of one thereof will suffice.

Referring to Figure 1, each of the control valves, valve 10 for example, comprises a casing formed in two substantially cylindrical sections 12 and 13 having outwardly extending circumferential base flanges 14 and 15, respectively, bolted together and clamping between them the outer marginal portion of a flexible diaphragm 16 of suitable material. Casing section 13 is provided at its upper end with a neck 17 which slidably receives a plunger 18 having a circumferential groove receiving an O sealing ring 19 providing an air tight seal about plunger 18. A cup 20, secured to the inner end of plunger 18, receives the upper end of a compression spring 21 the lower end of which seats on an outer circumferential flange 22 of a tubular vacuum control valve member 23 disposed within spring 21 and also seating at its upper end in cup 20. The inner marginal portion of diaphragm 16 is clamped between flange 22 and a clamp ring 22a disposed at about the midlength of valve member 23 and secured thereto in a suitable manner, as by having a drive fit thereon. The lower portion of valve member 23 is slidable through a guide 24 secured in the lower portion of casing section 12 in a suitable manner, as by having a drive fit therein. A compression spring 25, considerably lighter than spring 21, is disposed about valve member 23 and confined between guide 24 and a seat member 26 seating on flange 22a. Casing section 12 is provided at its lower end with an air inlet port 27 concentric with, and of materially greater diameter than, valve member 23, and a valve seat element 28. The lower end of valve member 23 is accurately formed to provide a seat for an air intake disc valve member 29, formed of rubber or any suitable material, operable in an open valve cage 30 suitably secured, conveniently by welding, to the bottom of casing section 12. A compression spring 32, confined between the bottom of valve cage 30 and disc valve member 29, yieldingly urges the latter toward valve member 23 normally holding it seated thereon. When the vacuum control valve member 23 is in its normal brake releasing position, shown in full lines in Figure 1, disc valve 29 is spaced from its seat element 28 admitting air, through port 27 and openings 24a in guide 24, to the casing section 12. The vacuum control valve member 23 is provided with an opening 33 to the interior of casing section 13, which has a nipple 13a opening thereinto, and casing section 12 has a nipple 12a opening into it.

The control valve means is used in connection with a brake pedal actuating suction operated power motor 36 and a booster, as will appear more fully later. Referring to Figure 2, the motor 36 includes a housing formed in two sections 37 and 38 secured together by a clamp ring 39 engaging over arcuate circumferential flanges 40 and 41 of sections 37 and 38, respectively, the flanges 40 and 41 clamping between them a peripheral bead 42 of circular cross section integral with a diaphragm 43 comprising a rim portion 44 formed of rubber or other suitable material and two discs 45 together providing the head of the diaphragm. The discs 45 are provided with peripheral beads 46 of circular cross section and with offset peripheral portions defining between them a channel in which is clamped a bead 47 extending about the radially inner edge of the rim portion 44 of the diaphragm 43. A tubular fitting 49 is inserted through end wall 50 of casing section 38 and is provided at its inner end with an outer circumferential flange seating on the inner face of wall 50. Fitting 49 is clamped to wall 50 by a nut 51 threaded thereon, there being a washer 49a interposed between nut 51 and wall 50. A plunger 52 is slidably mounted through fitting 49 and is provided at its inner end with a reduced screw stud 53 upon which is threaded an outer nut 54 clamping the center of the outer disc 45 to plunger 52, and an inner nut 55 clamping the center of the inner disc 45 between the nuts 54 and 55. Wall 50 of section 38 of the casing of motor 36 is provided with an opening 56 through which that end of the casing of motor 36 has permanent communication with the atmosphere and section 37 of the casing of motor 36 has secured through end wall 57 thereof a nipple 58 by means of which the interior of the casing of motor 36, between the diaphragm 43 and wall 57, may be connected to a source of suction, as will be explained presently. A spiral compression spring 59 is confined between discs 45 of diaphragm 43 and wall 57 of the motor casing and yieldingly urges the discs 45 and with them the plunger 52 outward of the casing.

The suction operated power motor 36 of Figure 2, which is the primary operating motor of the braking means of my invention, is mounted adjacent the brake pedal 61 of the automobile on the front of the fire wall 62, through which plunger 52 extends, as shown. The brake pedal 61 (Fig. 3) is disposed adjacent the steering column (not shown), at the left thereof and the accelerator pedal (not shown) is spaced a short distance from the steering column at the right thereof, in accordance with the usual practice. The brake pedal 61 is pivoted at 63, is normally held raised by suitable yielding means (not shown) and has operating connection at 64 to master cylinder 65 of the brake means of my invention, to be considered more fully presently. Plunger 52 is provided at its rearward end with an L shaped head 65 finger 66 of which overlies brake pedal 61 at the rear thereof, when pedal 61 is in its normal position. Accordingly, the brake pedal 61 may be used for braking purposes by foot pressure either independently of motor 36 or in conjunction therewith, as desired or as circumstances may require.

Referring to the diagram of Figure 3, nipple 58 of the suction operated primary motor 36 is connected by conduit 69 to nipple 12a of control valve 10. Nipple 13a of control valve 10 is connected by conduit 70 and a T fitting 71 to a suitable source of suction, conveniently the intake manifold 72 of the automobile engine. Nipple 13a of control valve 11 is connected by a conduit 73 and fitting 71 to intake manifold 72 and nipple 12a of control valve 11 is connected by a conduit 74 to a booster 75. The booster 75 may be of any suitable type, that shown being made by Midland Steel Products Corporation of Owasso, Michigan, and being essentially the same in operation as the booster unit of Patent No. 2,598,604.

It includes a suction operated unit 76 and a pressure transmitting cylinder 77 and is provided with an intake with a suitable air filter or cleaner 78. The cylinder 77 is connected by a conduit 79 to a conduit 80 having connection to conduits 81 connected to the brake wheel cylinders 82 for transmitting pressure thereto, there being suitable fittings interposed in the conduits, as shown. The master cylinder 65 is connected by conduit 83 to the booster 75 in the usual manner. In the conventional power brakes presently used, above referred to, pressure applied to the brake pedal is transmitted from the master cylinder to the booster unit 75, a portion of such pressure being transmitted by means of cylinder 77 to the wheel brake cylinders and a portion of the pressure from the master cylinder being effective for establishing communication between the suction operated unit 76 of the booster 75 and the intake manifold 72, for operating unit 76 and thereby applying additional pressure to the associated cylinder 77 to augment the pressure transmitted from the master cylinder to the brake cylinders, thereby increasing or boosting the effective pressure in the wheel brake cylinders. In the brake system of my invention, shown diagrammatically in Figure 3, I provide means whereby the suction operated unit 76 of the booster 75 may be disabled and enabled, as conditions require, so that the available braking power may be reduced at lower driving speeds, thereby avoiding the over-sensitiveness of the ordinary power brake system, and may be increased to maximum when driving at the higher speeds. I thereby provide means whereby the braking effect may be varied within a wide range to suit driving conditions while also providing means whereby braking may be effected without necessitating the driver removing his foot from the accelerator pedal, thereby eliminating delay in initiating the braking operation, which can be of importance in case of imminent collision.

The two valves 10 and 11 are juxtaposed and are secured together by a Y bracket 85 disposed therebetween and bolted thereto and extending upward thereabove. A cam shaft 86 is rockably mounted in bracket 85 and has secured thereon two cams 87 and 88 disposed to contact the upper ends of the plungers 18 of valves 10 and 11, respectively. The cam shaft 86 is provided at one end thereof with a crank arm 89 to which is anchored one end of a tension spring 90 anchored at its other end to a fixed point 91. Tension spring 90 normally holds crank arm 89 in contact with a stop 92 thereby holding the cam shaft 86 in such angular position that the high point of the cam 87 bears upon the upper end of plunger 18 of control valve 10 and the low point of cam 88 bears upon the upper end of the plunger 18 of the control valve 11. The tubular valve member 23 of valve 10 is then held in its fully lowered or depressed position shown in Figure 1, with its lower end seating on and closed by the disc valve member 29 and the latter spaced a material distance below its associated seat element 28. Valve 10 is then opened to atmosphere, through port 27 and openings 24a of guide 24, and closed to the source of suction or intake manifold 72, both sections of the housing of motor 36 being then open to atmosphere and section 37 thereof being closed to suction thereby rendering the motor 36 ineffective. The tubular valve member 23 of valve 11 is then in its fully raised position, spaced to maximum extent above disc valve member 29 with the latter seated on its seat element 28. Conduit 74 is then open to the suction source 72 enabling the booster, if the automobile engine is in operation. When cam shaft 86 is in position conditioning the system for operation, as explained more fully presently, valve 10 is closed to atmosphere and valve 11 is opened to atmosphere. Braking may then be effected by foot depressing the pedal 61, in the event of failure of the motor 36, as a safety measure, but normally braking is effected by the control valve means in conjunction with motor 36, as will appear presently.

Crank arm 89 of cam shaft 86 is connected by a cable 93 to an operating member for turning cam shaft 86 in opposition to the tension spring 90. Any suitable means may be provided for turning cam shaft 86 in the manner stated, though preferably I provide an operating member mounted on the steering column beneath and adjacent the steering wheel of the automobile and having appropriate connection to the cable for pulling the latter upward in the upward movement of the operating member, as disclosed in my co-pending application, Serial Number 638,243, for Automobile Power Brake Means, filed February 5, 1957. A suitably disposed stop 94 limits turning of the cam shaft 86 by the cable 93 in brake applying direction.

The cams 87 and 88 normally are in their positions shown in Figures 4 to 6, inclusive. They are so formed and disposed that when the system is conditioned for operation, by turning cam shaft 86 clockwise, the valve member 23 of valve 10 is moved upward, by springs 25 and 32, as permitted by cam 87, until the disc valve member 29 is seated, closing the air inlet port 27. The valve 10 is then closed to atmosphere. Simultaneously with the closing of valve 10 to atmosphere, an abrupt shoulder 88a of cam 88 depresses plunger 18 of valve 11 to its full extent. Valve 11 is then open to atmosphere and closed to suction and remains so until braking power additional to the maximum power of motor 36 is required, as will be explained presently. The booster 75 is then disabled and the brakes are under control of the motor 36. Thereafter, in the continued clockwise turning of cam shaft 86, valve member 23 of valve 10 is moved further upward by spring 25, away from disc valve member 29, thus opening to increasing extent section 37 of the housing of motor 36 to the intake manifold 72, by way of T fitting 71, conduit 70, nipple 13a, opening 33 in valve member 23, valve member 23, nipple 12a, conduit 69 and nipple 58. In that manner the braking effect exerted by the motor 36 may be smoothly increased as desired up to maximum and, by turning cam shaft counterclockwise, reducing the extent of opening of valve member 23 of valve 10, the braking effect of motor 36 may be decreased. The motor 36 thus provides highly effective hand controlled braking means of adequate power when travelling at moderate or low speeds. During the increasing opening of valve 10 to suction, valve 11 is maintained open to atmosphere but is permitted to move gradually in closing direction, cam 88 being appropriately formed to that end. As valve 10 approaches its maximum opening to suction, valve 11 is closed to atmosphere and, after valve 10 is opened to its maximum extent to suction, further turning of cam shaft 86 opens valve 11 to its maximum extent to suction. That renders available, under hand control, the full power of both the motor 36 and the booster 75 for braking to a crash stop in emergencies.

As previously noted, in the normal position of cam shaft 86, valve 10 is open to atmosphere and closed to suction, disabling motor 36, and valve 11 is closed to atmosphere and open to suction to its full extent, enabling the booster 75. The braking system is conditioned for operation by turning cam shaft 86 to position closing valve 10 to atmosphere and opening valve 11 to atmosphere, as previously explained. Braking may then be effected by means of the brake pedal lever 61, independently of the hand control means, as when travelling at the higher speeds. When travelling at low or moderate speeds, the hand control braking means may be used independently of the foot brake means, the latter being then also available for use in case of emergency. Further, by turning cam shaft 86 to its extreme clockwise position the power of both the motor 36 and the booster 75 become available for braking to a crash stop and, in emergency, may be augmented by foot pressure on the brake pedal lever. I thus provide hand controlled braking means and brake pedal braking means, which may be used either independently or conjointly as circumstances may require, while providing adequate braking power in emergencies. The hand control braking means is particularly suitable for low or moderate speed driving, as in traffic, while providing adequate power under normal conditions and being highly flexible. The brake pedal means is well suited for use when driving at higher speeds and, as above noted, may be used in conjunction with the hand control means with the advantages above stated. Further, in the event of failure of the hand operated control valve means, or of motor 36, braking may still be effected by means of the foot pedal brake lever 61, as in the presently known power brakes referred to previously.

It will be understood that the various elements of the braking system of my invention may be mounted and disposed as desired or as circumstances may require, and that the forms thereof disclosed herein are by way of example only. It will also be understood that changes in detail may be resorted to without departing from the field and scope of my invention, and I intend to include all such variations, as fall within the scope of the appended claims, in this application in which the preferred form only of my invention has been disclosed.

I claim:

1. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, and control valve means for opening said motor to suction and closing said booster to suction.

2. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, and control valve means for opening said motor to suction and closing said booster to suction and thereafter opening said motor to suction to variable extent while maintaining said booster closed to suction.

3. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, and control valve means normally opening said motor to atmosphere and closing it to suction and closing said booster to atmosphere and opening it to suction, said control valve means being operable to close said motor to atmosphere and open it to suction and open said booster to atmosphere and close it to suction.

4. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, and control valve means normally opening said motor to atmosphere and closing it to suction and closing said booster to atmosphere and opening it to suction, said control valve means being operable to close said motor to atmosphere and open it to suction and open said booster to atmosphere and close it to suction and thereafter progressively increase the opening of said motor 5. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, and control valve means normally opening said motor to atmosphere and closing it to suction and closing said booster to atmosphere and opening it to suction, said control valve means being operable to close said motor to atmosphere and open it to suction and to close said booster to suction and open it to atmosphere and thereafter open said booster to suction and close it to atmosphere while maintaining said motor open to suction and closed to atmosphere.

6. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, and control valve means normally opening said motor to atmosphere and closing it to suction and closing said booster to atmosphere and opening it to suction, said control valve means being operable to close said motor to atmosphere and open it to suction and to close said boster to suction and open it to atmosphere and thereafter open said booster to suction and close it to atmosphere while maintaining said motor open to suction and closed to atmosphere, said control valve means being thereafter further operable to open both said motor and said booster to suction progressively and to increasing extent until both thereof are fully opened to suction.

7. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having a casing and a wall movable in braking direction and in brake releasing direction, operating connections between said wall and said pedal for moving the latter in braking direction in the movement of said wall in braking direction and releasing said pedal in the movement of said wall in brake releasing direction, and control valve means operable for opening said motor to suction and closing said booster to suction and thereafter opening said booster to suction while maintaining said motor open to suction.

8. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, connections between said motor and said suction source including a first control valve operable for opening said motor to atmosphere and closing it to suction and for closing said motor to atmosphere and opening it to suction to variable extent, connections between said booster and said suction source including a second control valve operable for opening said booster to suction, and control valve operating means effective for closing said motor to atmosphere and opening it to suction and opening said booster to atmosphere and closing it to suction and thereafter varying the extent of opening of said motor to suction.

9. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction while accommodating movement of said pedal in braking direction independently of said motor, connections between said motor and said suction source including a first control valve operable for opening said motor to atmosphere and closing it to suction and for closing said motor to atmosphere and opening it to suction to variable extent, connections between said booster and said suction source including a second control valve operable for opening said booster to suction, and control valve operating means effective for closing said motor to atmosphere and opening it to suction and opening said booster to atmosphere and closing it to suction and thereafter varying the extent of opening of said motor to suction.

10. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction, connections between said motor and said suction source including a first control valve operable for opening said motor to atmosphere and closing it to suction and for closing said motor to atmosphere and opening it to suction to variable extent, connections between said booster and said suction source including a second control valve operable for opening said booster to suction and closing it to atmosphere and closing it to suction and opening it to atmosphere, and control valve operating means normally effective for opening said motor to atmosphere and said booster to suction and operable for closing said booster to suction and opening said motor to suction and then opening said booster to suction while maintaining said motor open to suction and thereafter opening said motor to suction to variable extent.

11. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction while accommodating movement of said pedal in braking direction independently of said motor, connections between said motor and said suction source including a first control valve operable for opening said motor to atmosphere and closing it to suction and for closing said motor to atmosphere and opening it to suction to variable extent, connections between said booster and said suction source including a second control valve operable for opening said booster to atmosphere and closing it to suction and closing said booster to atmosphere and opening it to suction, and control valve operating means normally effective for opening said motor to atmosphere and said booster to suction and operable for opening said booster to suction and closing it to atmosphere.

12. In a power brake system for automobiles, wheel brake cylinders, a suction operated booster connected to said cylinders for transmitting pressure thereto, a master cylinder connected to said booster for transmitting pressure thereto and to said wheel brake cylinders, a brake pedal having operating connection to said master cylinder, a suction source, a suction operated power motor having operating connection to said pedal for moving it in braking direction while accommodating movement of said pedal in braking direction independently of said motor, connections between said motor and said suction source including a first control valve operable for opening said motor to atmosphere and closing it to suction and for closing said motor to atmosphere and opening it to suction to variable extent, connections between said booster and said suction source including a second control valve operable for opening said booster to atmosphere and closing it to suction and for closing said booster to atmosphere and opening it to suction, and control valve operating means normally effective for opening said motor to atmosphere and said booster to suction and operable for closing said booster to suction and opening said motor to suction and then opening said booster to suction while maintaining said motor open to suction and thereafter opening said motor to suction to variable extent.

References Cited in the file of this patent

UNITED STATES PATENTS

| | | |
|---|---|---|
| 1,834,368 | Arbuckle | Dec. 1, 1931 |
| 2,352,357 | Almond | June 27, 1944 |
| 2,365,960 | Ingress | Dec. 26, 1944 |
| 2,562,704 | Dubreuil | July 31, 1951 |
| 2,719,609 | Price | Oct. 4, 1955 |